United States Patent [19]

Lea

[11] Patent Number: 4,831,567
[45] Date of Patent: May 16, 1989

[54] METHOD AND APPARATUS FOR PILOT TRAINING

[75] Inventor: Alan J. Lea, St. Lambert, Canada

[73] Assignee: Pratt & Whitney Canada Inc., Longueuil, Canada

[21] Appl. No.: 176,822

[22] Filed: Apr. 4, 1988

[51] Int. Cl.$^4$ .................. G06G 7/48; F01B 21/04
[52] U.S. Cl. ..................... 364/578; 60/711; 60/698; 244/17.13; 340/515; 364/550; 364/579
[58] Field of Search .............. 60/698, 700, 711, 716; 244/17.11, 17.13, 17.19; 340/515; 364/431.01, 431.03, 431.02, 434, 440, 424.03, 463, 550, 551.01, 505, 578, 579; 434/33, 54

[56] References Cited

U.S. PATENT DOCUMENTS

| | | | |
|---|---|---|---|
| 3,869,862 | 3/1975 | Dickey | 244/17.11 |
| 3,930,366 | 1/1976 | Nelson | 60/39.15 |
| 3,938,320 | 2/1976 | Nelson | 60/39.14 |
| 3,963,372 | 6/1976 | McLain et al. | 416/30 |
| 3,969,890 | 7/1976 | Nelson | 60/39.15 |
| 4,089,493 | 5/1978 | Paulson | 244/135 R |
| 4,147,035 | 4/1979 | Moore et al. | 60/711 |
| 4,277,945 | 7/1981 | Esthimer et al. | 60/711 |
| 4,423,593 | 1/1984 | Zagranski et al. | 60/39.161 |
| 4,478,038 | 10/1984 | Cropper et al. | 60/39.02 |
| 4,500,966 | 2/1985 | Zagranski et al. | 364/432 |
| 4,751,662 | 6/1988 | Crosbie | 364/578 |

Primary Examiner—Parshotam S. Lall
Assistant Examiner—Kevin J. Teska
Attorney, Agent, or Firm—Troxell K. Snyder

[57] ABSTRACT

A method and system for providing training mode operation of a multiple engine aircraft simulates the failure of one engine and the simultaneous operation of at least one other engine in an elevated, emergency power condition. The engines (20, 22) are mechanically linked (24) and provide a single power output (26). A training power schedule (56a, 56b) is selected (60, 62) to limit the combined engine power output to a level equivalent to the combined output with one engine inoperative and another in an elevated, emergency power operating condition.

5 Claims, 2 Drawing Sheets

METHOD AND APPARATUS FOR PILOT TRAINING

FIELD OF THE INVENTION

The present invention relates to a method and system for training pilots in the operation of an aircraft under emergency operating conditions.

BACKGROUND

The training of pilots for aircraft operation during emergency conditions has long been a concern for aircraft operators and pilot instructors. One particular type of training applies to pilots of multi-engine aircraft wherein the engines are mechanically linked so as to effectively provide a single, combined power output for propelling or lifting the aircraft.

One example of such aircraft is a dual engined helicopter wherein a pair of engines, linked by a gear box, together drive a main rotor for providing lift and maneuvering to the aircraft. Failure of one of the engines in such dual engine helicopters does not necessarily preclude operation of the aircraft with only the remaining operating engine, however the total available power is greatly reduced.

The powerplant in a modern helicopter is typically a gas turbine engine which usually operates within a normal rated power output range. Such engines are capable of producing power at a level significantly above the normal rated power range, however such operation in this elevated power output greatly reduces the lifetime of certain critical components such as the turbine blades, etc. Operation of a dual engine helicopter following the failure of one engine typically calls for the relaxing of normal engine control criteria and allows the aircraft operator to demand and receive power from the remaining operating engine at levels in excess of the normal operating range. The shift in control logic is justified in such emergency situations for obvious safety reasons.

The training of helicopter pilots for engine failure operation has long been a problem for instructors and aircraft operators. Realistic flight training with fully loaded aircraft requires the pilot to temporarily disable the fuel control on one engine, reducing it to an idle condition and hence effectively zero power output, and then operate the other engine within its elevated emergency rated power range. As noted above, such emergency power operation shortens the lifetime of the engine, increasing the frequency of expensive maintenance.

Aircraft gas turbine engines are rated by manufacturers and regulatory agencies for each permitted mode of operation. The rating of an engine establishes allowable time limits for operation at various power levels. Such limits may range from continuous at normal or part-throttle levels to under three minutes for the highest emergency power levels. One factor in determining a "one-time emergency" limited rating for an engine is the frequency with which the engine is expected to deliver such power. The training method discussed above requires repeated us of "emergency" power during training exercises, resulting in a lower power level than would be allowable for a truly one-time emergency use.

Another alternative commonly used within the industry is to reduce the weight of the aircraft to a minimum, operate the one engine at flight idle with the other engine being controlled within its normal rated operating range. This method, which attempts to give the trainee experience in operating the aircraft with reduced available power, does not accurately simulate the dynamics of the aircraft in a fully loaded condition. Such simulation is extremely valuable, particularly in practicing aircraft operation under windy, congested, or other complicating conditions.

One further disadvantage to the prior art methods described hereinabove results from operation of the helicopter with one engine in an idle condition. Should for any reason the power producing engine experience an unplanned failure requiring the idling engine to be brought up to a full power state, the aircraft will experience a period of time in which the total available power is extremely low thereby restricting maneuverability and possibly operating safety margins.

What is needed is a pilot training method and system which permits extended operation of the aircraft in a simulated, one engine failed mode and which does not significantly shorten the life of the aircraft engine components and which is able to accommodate an unplanned engine failure within the training mode without experiencing a severe, short-term cumulative power deficit.

SUMMARY OF THE INVENTION

It is therefore an object of the present invention to provide realistic training operation for a multi-engine aircraft having a single power output, such as a helicopter, wherein aircraft operation with the failure of one engine is accurately simulated.

It is further an object of the present invention to provide such training operation without subjecting any one of the aircraft engines to operation outside of a normal rated, continuous, operating range.

It is further an object of the present invention to accomplish said training operation with the aircraft fully loaded, enabling the pilot-trainee to experience the actual dynamics of the aircraft operating with a failed engine.

According to the present invention, a method and system for controlling a multiple engine aircraft, such as a helicopter, wherein the engines cooperably provide a single power output, is selectable between the normal mode, wherein the engines jointly provide the aircraft propelling power, and a training mode wherein the operation of the aircraft with one of the engines in a failed condition is simulated.

The present invention monitors the current cumulative power output of the engines and, during operation in the training mode, limits the cumulative output to a level no greater than a preselected level equivalent to that available during operation of the aircraft with one of the engines inoperable and another of the engines operating at an emergency, elevated power output. This operation is accomplished by limiting the power output of each of the engines at approximately equivalent levels within the normal rated engine operating power range. As each of the engines is supplying part power, neither is subjected to the undesirable wear rates which occur during operation in the emergency power range.

Unlike the prior art method of operating a lightened aircraft with one engine throttled down and the others controlled within the normal power output range, the method according to the present invention permits training with a fully loaded aircraft thereby accurately simulating the maneuvering dynamics, etc.

An additional feature of the method and system according to the present invention is the ease of transition between the training mode and the normal operation mode. The training mode of the present invention, by maintaining individual engine power levels substantially equivalent, avoids any time lag resulting from the runup of the idling engine in the prior art. The avoidance of such runup lag can also shorten the recovery period following an unexpected failure of the operating engines during the training mode operation.

Both these and other objects and advantages of the present invention will be appreciated by those skilled in the art following careful review of the following specification and the appended claims and drawing figures.

GAS TURBINE ENGINE OPERATION

Figure 1:
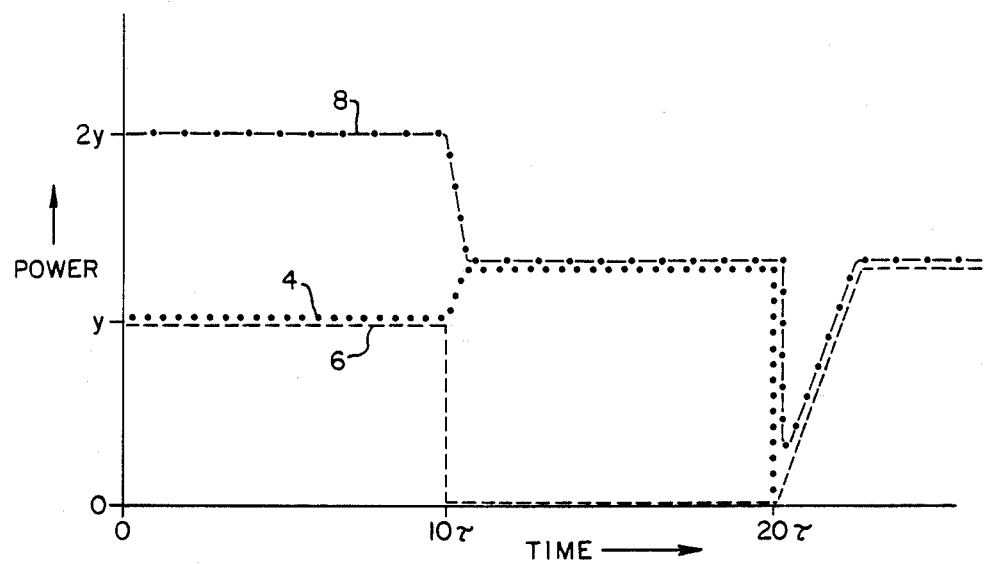
FIG. 1 shows a graphic representation of combined power and individual engine power for a dual engine aircraft being operated according to the prior art methods for simulating emergency power operation.

The control of a turboshaft gas turbine engine typically requires the control system to regulate the flow of fuel to the turbine combustor responsive to a power demand signal generated by the aircraft operator. This flow of fuel must be limited both as to magnitude and as to rate of change depending on a number of engine variables, including shaft speed, torque, turbine inlet temperature, etc. The engine controller regulates the flow of fuel to the engine combustor in response to these sometimes conflicting demands to achieve economical, efficient, and effective engine power.

The power output of a gas turbine engine is typically related to the flow of fuel to the combustor section, with the actual power output limited by the high temperature endurance of the engine components immediately downstream of the fuel combustor. The engine controller thus restricts fuel flow (and hence turbine inlet temperature), to a rate which will permit the pilot to receive normal rated "full" power output for an extended period of time.

For multiple engine aircraft, such as a dual engine helicopter, two or more engines are mechanically linked by a gearbox or the like to effectively provide a single mechanical output for propelling or lifting the aircraft. Such multiple engine aircraft are designed so as to be able to continue operations, in at least a limited fashion, should one of the engines experience an unplanned failure/inflight shutdown. The mechanical linkage therebetween is arranged so as to continue to transmit the power of the remaining engine or engines to a combined power output shaft, while allowing the inoperative/failing engine to be shut down or stopped.

During such engine failure situations, it is frequently advantageous for the pilot to have the ability to receive power output in excess of the normal rated full output power from the remaining operative engine or engines. Operation of a gas turbine engine in excess of the normal rated power output as stated above does reduce the lifetime of certain engine components and thus the time between overhaul of certain critical engine components. Nonetheless, it is possible to safely operate such engines at an elevated power level for a short period of time, and can be necessary under certain circumstances to avoid damage to the aircraft and its occupants.

PRIOR ART TRAINING METHODS

Training of pilots under simulated engine failure conditions is an important part of the training process. While ground simulation and the training methods discussed in the preceding Background section can provide an imitation of the aircraft power and maneuverability following failure of one engine in a multiple engine aircraft, these methods fall short of simulating the aircraft dynamics at actual reduced power output levels and operation. The most realistic simulation, wherein one engine of a dual engine helicopter or the like is reduced to idling speed and the other operated at emergency power, is not only damaging to the operating engine unless restricted to a very short time span, but additionally has the disadvantage of lengthening the time required to recover even partial power should the one engine operating at emergency power experience a failure during the training mode of operation.

Operation with this prior art method is illustrated in FIG. 1 wherein the vertical axis measures output power and the horizontal axis time. Curve 4 represents the power output of a first engine of a dual engine aircraft, curve 6 represents the power output of a second engine of such aircraft, and curve 8 represents the total cumulative power of the first and second engines. Thus, between time zero and $10\tau$, the first and second engines are each shown delivering power output equal to y which, for this figure, represent full normal output power. The total combined output power 8 is thus 2y.

Still referring to FIG. 1, the time between 10; and $20\tau$ represents training mode operation according to the prior art. At time $10\tau$, the second engine "fails" by being throttled back to an effective output power level of zero while the first engine is operated at an elevated, emergency rated power level. During such emergency operation, the first engine is operated so as to produce an additional 30% power over the normal "full" power rating. Thus the total cumulative power during training mod operation is approximately 1.3 y. At time greater than $20\tau$, an actual failure of the operating first engine is illustrated. At time $20\tau$ the power curve associated with the first engine drops rapidly to zero, while the power curve 6 associated with the second engine increases as the second engine is run up to emergency rated power operation. The cumulative power curve 8 dips dramatically during the lag between the failure of the first engine and runup of the second engine reflecting a major temporary power loss for the aircraft.

DETAILED DESCRIPTION OF THE INVENTION

Figure 2:
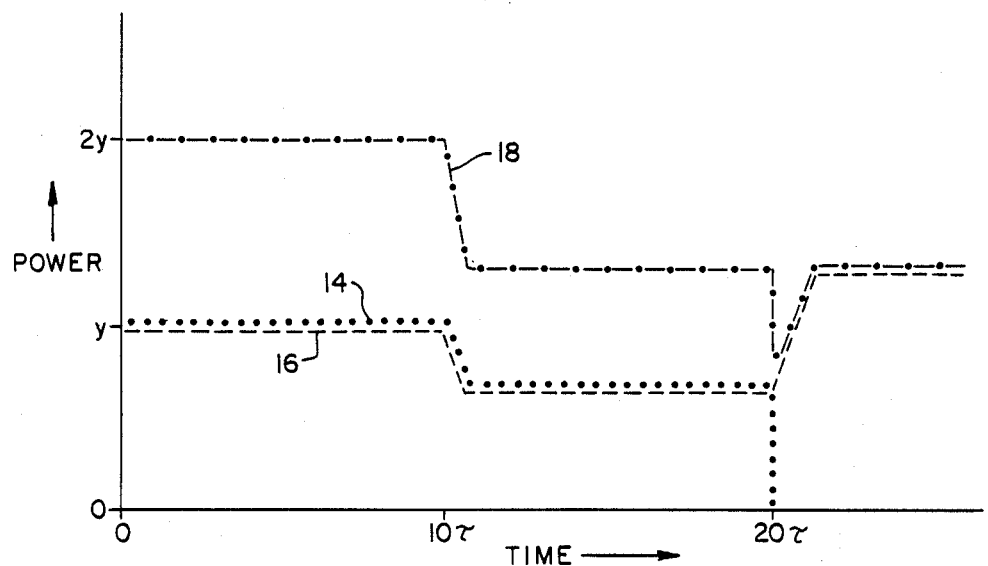
FIG. 2 is a graphic representation of combined power and individual engine power for an aircraft operated according to the training method of the present invention.

FIG. 2 shows the power output 14, 16 of each engine in a dual engine aircraft operated according to the training method of the present invention. Curve 18 shows the combined or cumulative power output of the aircraft engines. As in the preceding figure, the time period between zero and $10\tau$ represents full normal power operation of both engines, each delivering power at level y, with a combined output power 2y, as shown by the combined curve 18.

According to the method of the present invention, time 10τ through 20τ represents a training mode operation wherein each engine is limited to an individual power output of 0.65 y, giving a combined power output of 1.3 y, which is equivalent to the power output of a single engine operating within an emergency, elevated power range. Thus, neither engine operating according to the training method of the present invention provides power outside of the normal rated operating range, allowing extended operation in the training mode without any accelerated deterioration of the engine structures or components. Both engines are controlled to substantially equivalent power output levels, thereby balancing engine wear and usage.

Another advantage is apparent at time greater than 20τ wherein the actual failure of one of the engines is represented The cumulative power drop is much reduced from the comparable dip in the prior art as shown in FIG. 1 due to the fact that the other engine is already operating at 65% normal rated power, as well as the fact that the failing engine had been supplying only half the aircraft combined power output prior to failure Thus, in the unlikely event that one engine should fail during training mode operation, the recovery of the aircraft to an actual emergency operating state is greatly reduced from the FIG. 1 system. It should be noted that the possibility of such failure is reduced as the engines according to the training method of the present invention never operate outside of the normal power range, hence avoiding unusual stresses and elevated operating temperatures which may accelerate wear and deterioration of certain engine components.

Similarly, and unlike the prior art method illustrated in FIG. 1, the training method according to the present invention permits extended operation of the aircraft in the training mode to provide the pilot trainee with extended practice in maneuvering and operation of the fully loaded aircraft without time limit restraints. Although operation of the aircraft in an actual emergency may require the operator to limit the operating time at emergency rated power to the extent practical, the method according to the present invention allows the pilot trainee to concentrate on learning the operation and dynamics of the aircraft, learning such time limit considerations for more advanced training.

Figure 3:
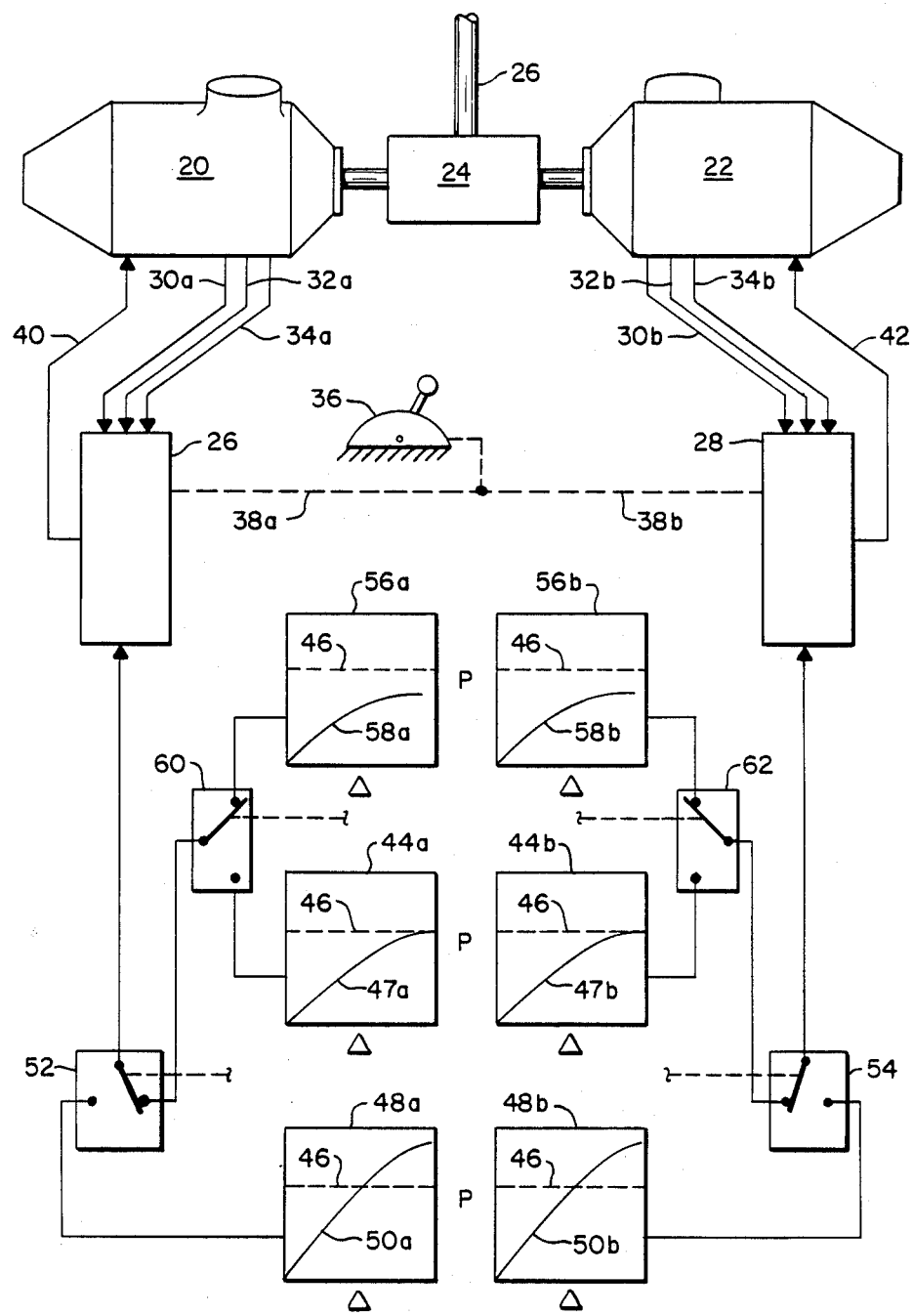
FIG. 3 shows a schematic representation of a control system adapted to achieve the method of operation according to the present invention.

FIG. 3 shows a system according to the present invention for achieving the training method discussed hereinabove. Dual gas turbine engines 20, 22 are mechanically linked via gearbox 24 to provide a single output at the main shaft 26. It is to be understood that the single combined power output represented by shaft 26 may in fact include a plurality of individual power output means, including electrical, hydraulic, mechanical, shaft, etc. all driven by the comingled output of the mechanically linked engines. Likewise, for a helicopter having multiple engines, the gearbox may supply shaft power to both the main rotor and the tail rotor rather than to a single shaft whose output is then divided among these components.

Gearbox 24 thus serves to function as a means for joining the mechanical output of engines 20, 22 and for allocating tee combined output among one or more output shafts, etc. Engines 20, 21 each include a fuel control 26, 28 respectively. Fuel controls 26, 28 each monitor certain engine parameters, including output torque 30a, 30b, output shaft speed 32a, 32b, and turbine inlet temperature 34a, 34b, etc. An operator demand signal schematically represented by power lever 36 is transmitted 38a, 38b to the respective controllers 26, 28.

Based upon the demand signals 38a, 38b and the current engine parameters, 30a, 30b, 32a, 32b, 34a, 34b, and other criteria, the controllers 26, 28 produce individual engine fuel control signals 40, 42 which regulate the flow of fuel to each engine 20, 22. It is important to note that the fuel control signals 40, 42 produced by the controllers 26, 28, while responsive to the operator demand at the power lever 36 or equivalent, nonetheless may be limited by the controller based on engine parameters 30-34 in order to avoid damage, instability, or other undesirable effects on the engine and aircraft.

During normal operation of the aircraft, one parameter used by the controllers 26, 28 is a power limitation represented schematically by the schedules 44a, 44b. Each shows engine output power on the vertical axis as compared to a power demand, Δ, on the horizontal axis Power output for each engine is limited to a level 46 compatabile with extended time operation. Thus, during normal operation, the engine controller is free to control fuel flow to the individual engines 20, 22 for providing power within the normal power range, limited 46 as represented by curves 44a, 44b.

Should one engine become inoperative in flight, aircraft systems include the ability to switch the fuel control of the operating engine into an emergency power operating mode wherein engine power output is allowed to exceed the long-term operating limit. Such emergency operation is represented by curves 50a, 50b. The emergency power curve 50a, 50b in each schedule 48a 48b exceeds the normal power limit 46 by a margin selected for the particular engine. The controllers 26, 28 include linked switching means 52, 54 for engaging the emergency power schedules 48a, 48b as required.

The system according to the present invention as illustrated in FIG. 3 provides an alternate power schedule 56a, 56b for use only during operation in the training mode and which replaces the normal power schedules 44a, 44b. Training power schedules 56a, 56b include power curves 58a, 58b, which remain below the normal full power limit 46 thereby limiting the combined power output of the engines 20, 22 to a level equivalent to that of a single engine operating at top emergency power. Training schedules 56a, 56b may be substituted for normal schedules 44a, 44b by linked switches 60, 62 which may be included in the individual engine fuel controllers 26, 28 or may be temporarily attached to the aircraft for training purposes.

The system according to the present invention while discussed in general terms and represented schematically in FIG. 3, is best suited for use with aircraft having digital electronic fuel controllers using software driven electronic circuitry for determining the fuel control output signals 40, 42. Such software driven controllers are relatively easy to reprogram thereby minimizing the impact on normal, non-training aircraft operation. Thus "switches" 60, 62, 52, 54 are equivalent to logical software operators for selecting between scheduled power limit parameters. Such digital software logic may additionally include a dynamic component for simulating the time response of the engine system during a failure event.

The use of a system as shown in FIG. 3 provides a further advantage in that the aircraft may be restored to normal operation from training operation very quickly should an actual external emergency arise. Likewise, should an individual engine fail during operation in the training mode, the emergency power schedules 48 are instantly available to the other operative engine so as to switch the controller into an emergency operating mode without delay.

Although shown and discussed above in relation to a dual engine helicopter aircraft, it must be appreciated that the system and method according to the present invention is well suited for simulating the operation of a wide variety of multiple engined vehicles and systems, and further, that the system and method disclosed herein is only one of a plurality of equivalent methods and means which will be apparent to those skilled in the art and which do not fall outside of the scope of the present invention, such scope being limited only by the claims presented hereinafter.

I claim:

1. In an aircraft propulsion system having a plurality of engines linked mechanically for providing a single, combined mechanical power output, each engine being operable over a normal, sustainable range of power output and an elevated, emergency, short-term range of power output, a method for operating said system in a selective training mode wherein a failure of one of the engines and the simultaneous operation of at least one other of the plurality of engines within the emergency range of power output is simulated, comprising the steps of:

monitoring the mechanical power output of each of the plurality of engines, comparing each engine power output with a simulation power output limit, the simulation limit determined responsive to an emergency combined power output limit produced by the plurality of engines during operation with one of the engines in a non-operative condition and at least one other engine operating in the emergency, elevated power range;

controlling the output power of each engine responsive to an operator demand signal such that
(a) each engine operates in the normal power output range,
(b) the output power of each engine is substantially equivalent, and
(c) the total combined power output of the linked plurality of engines does not exceed the emergency combined simulated output power limit.

2. The method as recited in claim 1, further comprising the steps of:

switching the aircraft propulsion system between a normal operating mode and the training mode during flight, thereby simulating an inflight failure of one of the plurality of engines.

3. The method as recited in claim 2, further comprising the steps of:

deselecting the training mode of the aircraft propulsion system immediately upon actual failure of one of the engines and returning the aircraft to a standard operating control method.

4. A control system for training pilots under conditions of simulated failure of one of a plurality of mechanically linked engines in a propulsion system of an aircraft, each engine having a normal operating power range for long-term operation, and an emergency, elevated power range for temporary operation, comprising:

means for providing an operator power demand signal to each engine, the combined engine power outputs being the total power output of the mechanically linked engines, means for comparing the demanded engine power outputs with a preselected training power output limit, said training power output limit selected to result in a combined power output equal to the total combined power generated during operation of the plurality of engines with one of the engines in a failed condition and at least another of the engines operating in the emergency power range, means, responsive to the comparing means, for limiting the combined power output of the mechanically linked engines to a level no greater than said training power output limit, and means, responsive to the limiting means, for controlling the output power of each engine wherein each of the plurality of engines operates within the normal operating power range thereof and the power output of each engine is substantially equivalent.

5. A control system as recited in Claim 4, wherein the comparing means includes means for switching between the preselected training power output limit and a normal power output limit.

* * * * *